United States Patent [19]

Schwerdt et al.

[11] Patent Number: 4,678,969
[45] Date of Patent: Jul. 7, 1987

[54] PSEUDO-RASTER WEATHER DISPLAY APPARATUS

[75] Inventors: Kurt R. Schwerdt, Bolton; Gerald B. Levine, Hudson, both of Mass.

[73] Assignee: Raytheon Company, Lexington, Mass.

[21] Appl. No.: 506,928

[22] Filed: Jun. 22, 1983

[51] Int. Cl.[4] ............................................. H01J 29/58
[52] U.S. Cl. ....................................... 315/382; 342/179
[58] Field of Search .............. 315/382, 383, 378, 386; 343/5 W; 342/178, 179, 180, 181; 358/218

[56] References Cited

U.S. PATENT DOCUMENTS

| | | | |
|---|---|---|---|
| 3,484,647 | 12/1969 | McGuinness | 315/386 |
| 4,091,311 | 5/1978 | Mendelsohn et al. | 315/382 |
| 4,388,619 | 6/1983 | Beck | 315/382 |

FOREIGN PATENT DOCUMENTS

| | | |
|---|---|---|
| 474399 | 11/1937 | United Kingdom . |
| 519330 | 3/1940 | United Kingdom . |
| 665096 | 1/1952 | United Kingdom . |
| 688857 | 3/1953 | United Kingdom . |
| 729685 | 5/1955 | United Kingdom . |
| 742789 | 1/1956 | United Kingdom . |
| 1027645 | 4/1966 | United Kingdom . |
| 1291981 | 10/1972 | United Kingdom . |
| 1449700 | 9/1976 | United Kingdom . |

*Primary Examiner*—Theodore M. Blum
*Attorney, Agent, or Firm*—Walter F. Dawson; Richard M. Sharkansky; Denis G. Maloney

[57] ABSTRACT

A display system employing a stigmator coil disposed on the neck of a cathode-ray tube to widen an electron beam primarily in a direction normal to the electron beam scanning direction to produce a continuous shading effect for displaying weather information. A bidirectional pseudo-raster scan writing pattern is used to obtain maximum fill effect between scan lines and illumination uniformity with far fewer raster lines than in a conventional raster display.

23 Claims, 7 Drawing Figures

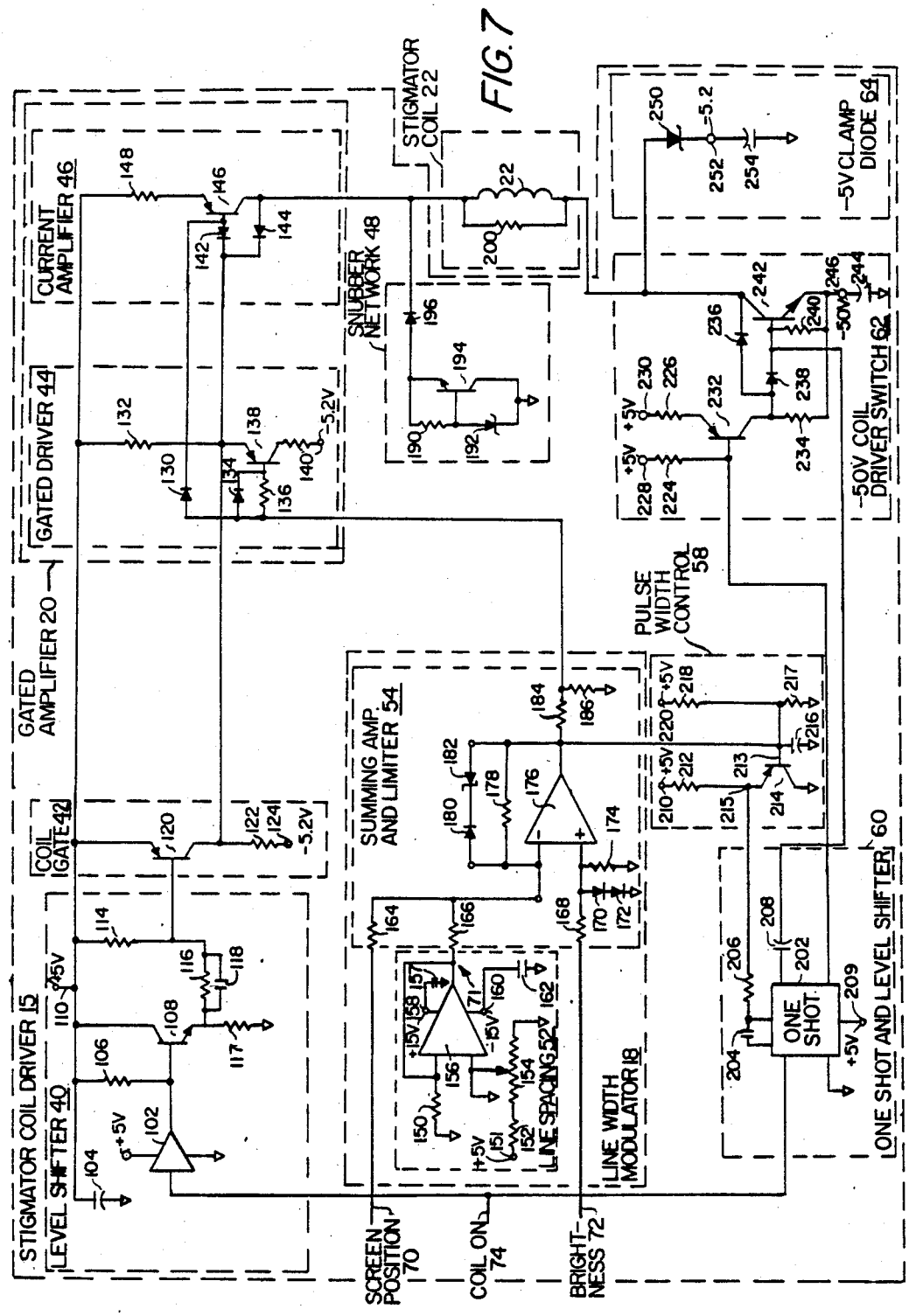

PSEUDO-RASTER WEATHER DISPLAY APPARATUS

BACKGROUND OF THE INVENTION

This invention relates to the display of weather or other shaded patterns on a cathode-ray tube. More particularly, it relates to apparatus for widening an electron beam of a cathode-ray tube in order to fill in the area between raster lines generated by a random access cursive display from data stored in a refresh memory permitting use of far fewer raster lines than in conventional raster displays.

The display of weather data on synthetic digital situation displays used for air traffic control and tactical military command and control is a valuable feature. The weather phenomenon typically covers one or more areas of the display and has one or more levels of intensity. Weather data describing a phenomenon (e.g., precipitation) is frequently derived from the same sensor as used for surveillance such as a primary radar; however, it may also be derived from a separate sensor(s) used specifically for weather detection and superimposed on the situation display. The problem addressed by this invention is the presentation of weather data on a random access, cursive (stroke) display in a form that is natural, unambiguous and consistent with the limitations of cursive display generation.

In current cursive display systems, the weather data is digitized and displayed as a series of contour lines and symbols, or hatch lines (radial or rectilinear) and symbols covering the weather area. This data is easily confused with and sometimes obscures other displayed data such as map lines, target symbology and radar data, particularly on a monochrome display. In earlier analog PPI displays, weather information is available in the broadband video signal and is displayed as clutter areas. Similarly on TV raster based display systems, weather is displayed as solid or filled-in areas of "clutter". Variations in weather are represented by intensity or color variations. This filled-in or continuous effect method for displaying weather is desirable based on human factors considerations relating to perception of the weather relative to other data on the display.

SUMMARY OF THE INVENTION

This invention discloses an apparatus for displaying weather data concurrently with target and graphics data on a cathode-ray tube of a display system. When weather data is to be displayed, a pseudo-raster pattern of lines are generated by the electron beam which is widened in a direction normal to the movement of the beam for substantially filling in the spaces between the raster pattern lines. A control signal stored in a refresh memory with the weather data causes the electron beam to be widened. A stigmator coil, disposed around the neck of the cathode-ray tube, generates magnetic flux lines when energized with drive current from a stigmator coil driver; resulting magnetic forces produce the widened, eliptically shaped electron beam. Line width control means maintains a constant line width for varying beam intensities or varying screen positions of the scanning electron beam.

BRIEF DESCRIPTION OF THE DRAWINGS

Other and further features and advantages of the invention will become apparent in connection with the accompanying drawings wherein:

FIG. 7 is a schematic diagram of the stigmator coil driver.

DESCRIPTION OF THE PREFERRED EMBODIMENT

Figure 1:
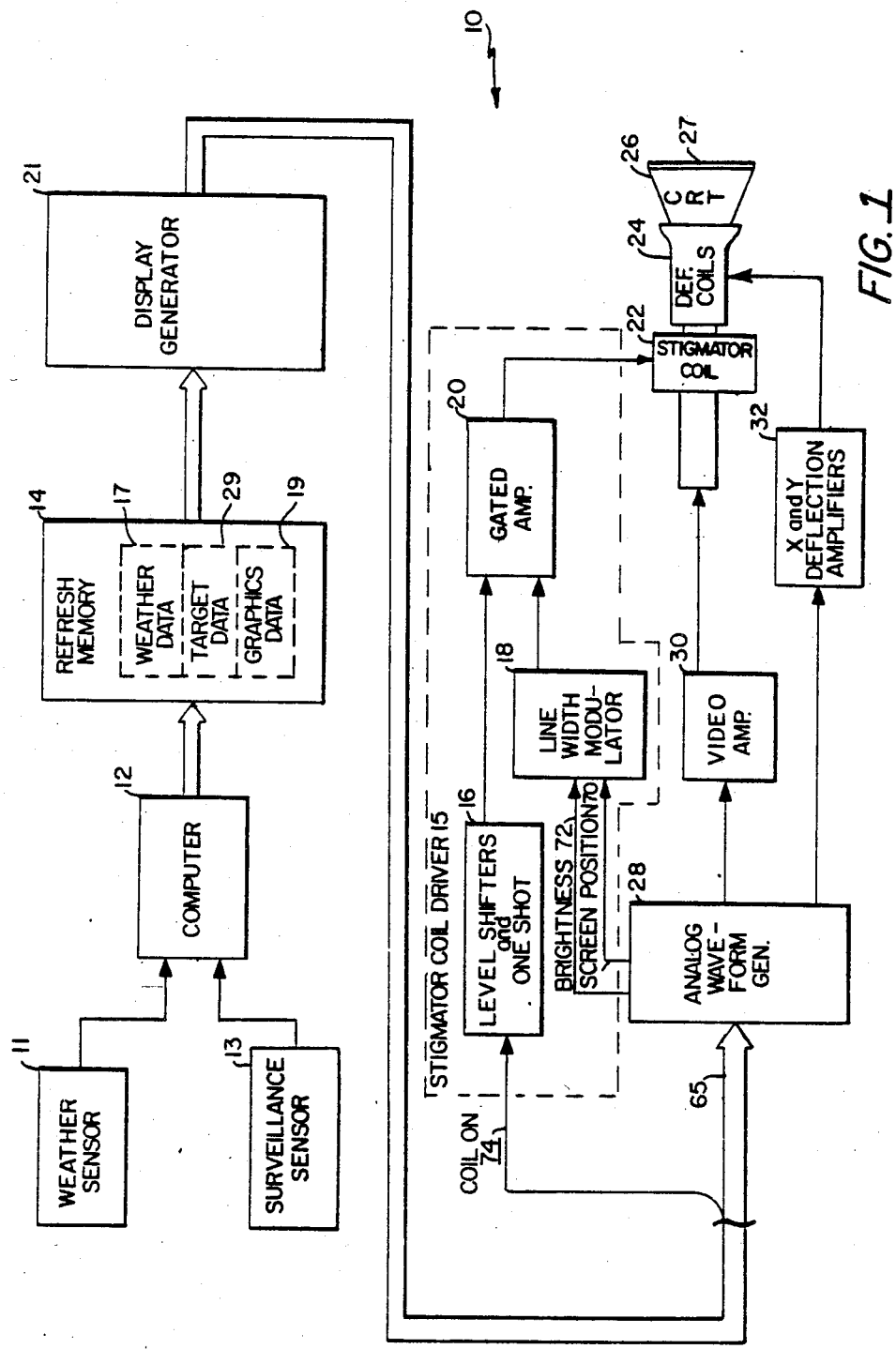
FIG. 1 is a system block diagram of a display system comprising a pseudo-raster weather display generator according to the present invention.
Figure 2:
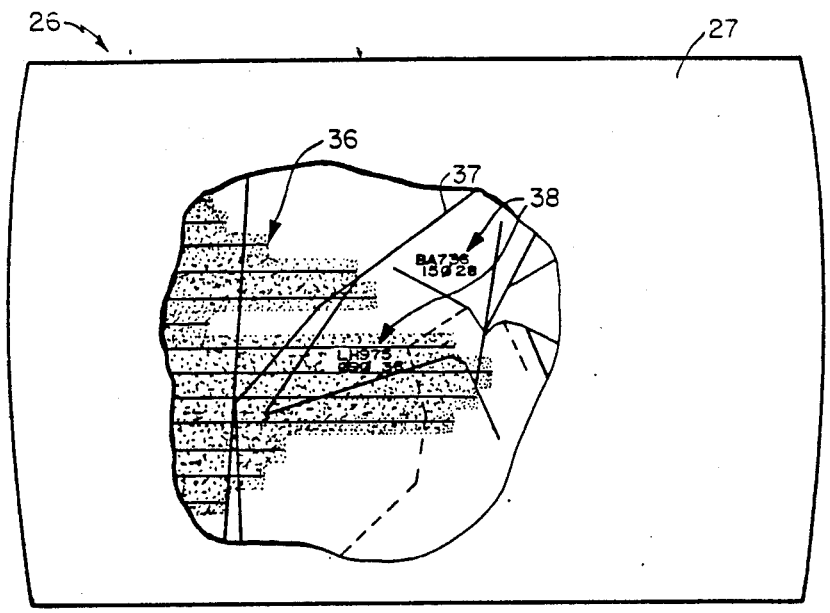
FIG. 2 illustrates a pseudo-raster display formed with a widened electron beam for displaying a weather pattern on the screen of a cathode-ray tube along with target and graphics information.

Referring to FIG. 1, there is shown a block diagram of a display system 10 comprising pseudo-raster display capability according to the present invention. This display system 10 provides a display of weather patterns by shading areas of a stroke (cursive) written cathode-ray tube (CRT) 26 rather than by displaying a collection of hatch lines, contours or symbols which interfere with other data on a display such as target data and graphic data. A raster-type pattern, with external boundaries that match those of weather data and comprising only 8-10 lines per inch, is generated bidirectionally under program control on the CRT 26 in selected areas. In FIG. 2 such a raster-type pattern 36 representing weather data is shown on a cursive display along with other standard vector 37 and alpha-nurmeric 38 information of an air traffic control system. Changing the shape of an electron beam by elongating the beam, primarily in a vertical direction and normal to the horizontal movement of the beam on a screen 27 of CRT 26, fills in the spaces between the selected pseudo-raster lines when a Coil On 74 control signal is generated by a display generator 21. The Coil On 74 signal causes a stigmator coil 22 to be energized which generates magnetic fields producing magnetic forces that elongate the electron beam primarily in one direction.

The cathode-ray tube 26 is a standard CRT known to one of ordinary skill in the art. The magnetic deflection coils 24 disposed around the neck of CRT 26 deflect an electron beam to the desired X and Y position on the screen 27. Stigmator coil 22 also disposed around the neck of CRT 26 and immediately adjacent to the deflection coils 24 electro-magnetically elongates the electron beam causing pseudo-raster lines to widen and merge together on the screen 27. The stigmator coil 22 requires minimal current, may be switched ON and OFF rapidly; and uses low voltages for its driver circuitry.

Figure 3:
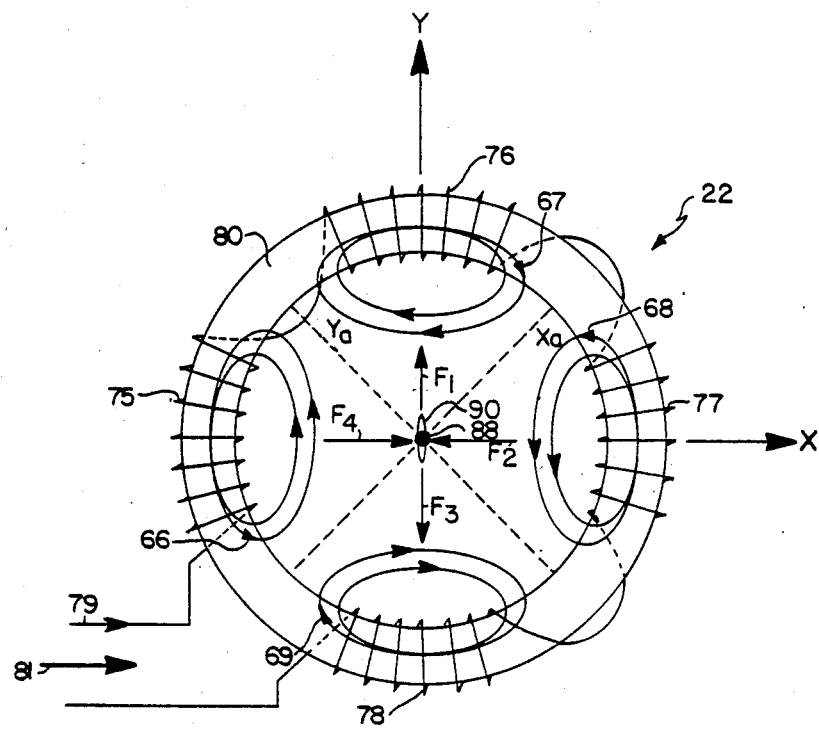
FIG. 3 is a schematic diagram of a quadrupole stigmator coil used in the present invention for producing lines of magnetic flux which results in magnetic forces that cause the elongation of an electron beam traveling out of the page.

Referring now to FIG. 3, the stigmator coil 22 comprises a circular magnetic core 80 on which four coils 75–78 are mounted and connected in an electrical series as shown forming a quadrupole winding 81. The four coils 75–78 are wound on the core 80 at equally spaced distances around the circumference of the core with the geometric center of each coil being separated by an arc angle of ninety degrees from the centers of adjacent coils as shown by the axes X and Y. A drive current flowing into line 79 generates a magnetic field in coil 75 which by the "right hand rule" induces magnetic flux lines in the core 80 in the direction shown by arrow 66. The magnetic field generated by the coil 76 induces magnetic flux lines in a direction shown by the arrow 67 which is opposite to the direction of the magnetic flux generated by coil 75. Similarly determined are the directions of the magnetic flux lines 68 and 69 generated by coils 77 and 78, respectively. The electron beam 88 (assumed to be traveling out of the page) is altered into an elliptically shaped electron beam 90 as it passes through the stigmator coil as a result of the magnetic forces F1, F2, F3 and F4 produced by the four distinct magnetic flux lines 66–69. The elongation of the electron beam 88 results from outwardly directed forces F1 and F2, and the electron beam 88 tends to be compressed as a result of inwardly directed forces F2 and F4. As previously described the stigmator coil is disposed around the neck of a CRT 26 immediately adjacent to the deflection coils 24 as shown in FIG. 1. The stigmator coil 22 is aligned on the neck of the CRT 26 by rotating it until the major axis of the elliptically shaped electron beam 90 lies along the Y or vertical axis. The quadrupole stigmator coil 22 may be embodied by a stigmator coil having an inductance of 45 microhenries and 3 amperes maximum current as manufactured by Discom of Westford, Mass.

Figure 4:
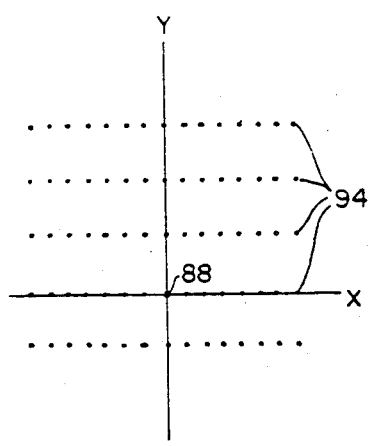
FIG. 4 illustates a standard scanning electron beam of a cathode-ray tube used to generate pseudo-raster lines or other graphic displays.
Figure 5:
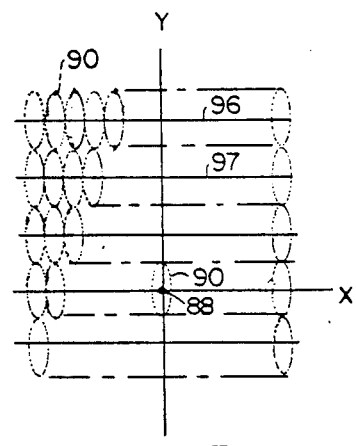
FIG. 5 illustates widened pseudo-raster lines produced by the scanning, elongated, electron beam which fills in the spaces between the lines of the pseudo-raster scan pattern generated on the screen of a cathode-ray tube.

Referring now to FIGS. 4 and 5, FIG. 4 shows a plurality of horizontal vectors or pseudo-raster lines which result from scanning the normal electron beam 88 of a cursive display horizontally across the CRT 26 at various vertical positions 94. Pseudo-raster lines on a cursive display use fewer horizontal vectors to accomplish a weather display otherwise requiring a high line density full screen raster as is used in conventional television raster systems. FIG. 5 shows the elongated, elliptically shaped electron beam 90 as it scans across the CRT screen 27 filling in the spaces between adjacent scan lines 96 and 97. The width of the elongated electron beam (or the length of the major axis of the elliptically shaped beam) is determined by the stigmator coil drive current which typically results in a line width of 100 mils when there are 2 amperes of drive current applied.

Referring again to FIG. 1 a stigmator coil driver 15 connected to the stigmator coil 22 primarily provides the current to drive the stigmator coil 22 and secondarily provides a correction factor to said drive current for maintaining constant line width on the face of the CRT 26 as the CRT drive voltage (brightness) varies or as screen position varies. The stigmator coil driver 15 comprises a level shifter and one shot 16, a line width modulator 18 and a gated amplifier 20. The level shifter and one shot 16 provides buffering of a Coil On 74 control signal prior to said signal being coupled to the gated amplifier 20 and generates a 2 microsecond pulse for applying a high voltage to the stigmator coil 22 for this 2 microsecond pulse interval. The line width modulator 18 receives a Brightness 72 signal and a Screen Position 70 signal from an analog waveform generator 28 and generates the aforesaid described correction factor which is coupled to gated amplifier 20 for controlling the stigmator coil 22 drive current so that a constant line width will appear on the screen 27 of the CRT 26. The line width modulator 18 also comprises an adjustment for initially setting-up the spacing between adjacent raster lines as illustrated in FIG. 5 in order that adjacent elongated raster lines will touch each other to produce a continuous shading effect for representing weather information.

Still referring to FIG. 1 a weather pattern to be displayed on the CRT 26 is obtained from a weather sensor 11 and target data is obtained from a surveillance sensor 13 which typically are radars, but may also be sonar or infrared devices. The output of the sensors 11 and 13 are coupled to a computer 12 which reformats the raw sensor data and then stores the reformatted weather data 17 and target data 29 in a refresh memory 14. Also, graphics data 19 is usually stored in the refresh memory 14.

The output of the refresh memory 14 is connected to a display generator 21 which decodes the data from the refresh memory along with character, brightness and position information in addition to providing the appropriate control signals for the proper display of said data on CRT 26. One of the non-multiplexed control signal lines from the display generator 21 is the Coil On 74 line which turns on the stigmator coil driver 15 when weather data is being displayed. The remaining signal lines 65 containing both discrete control signals and encoded display information are connected to the analog waveform generator 28. The analog waveform generator 28 provides character generation and logic decoding for the system 10. It also provides multiple video intensity levels of shading on a CRT screen 27 to indicate different levels of weather intensity. The outputs of the analog waveform generator 28 are coupled to the line width modulator 18, a video amplifier 30 and X and Y deflection amplifiers 32. The Screen Position 70 and the Brightness 72 outputs to the line width modulator 18 provide information for the generation of a correction factor for the drive current output from gated amplifier 20. A third output to video amplifier 30 whose output is connected to CRT 26 provides intensity modulation to the CRT display. A fourth output to the X and Y deflection amplifiers 32 whose outputs are connected to the deflection coils 24 provide the control for the electron beam movement on the screen 27 of the CRT 26.

Figure 6:
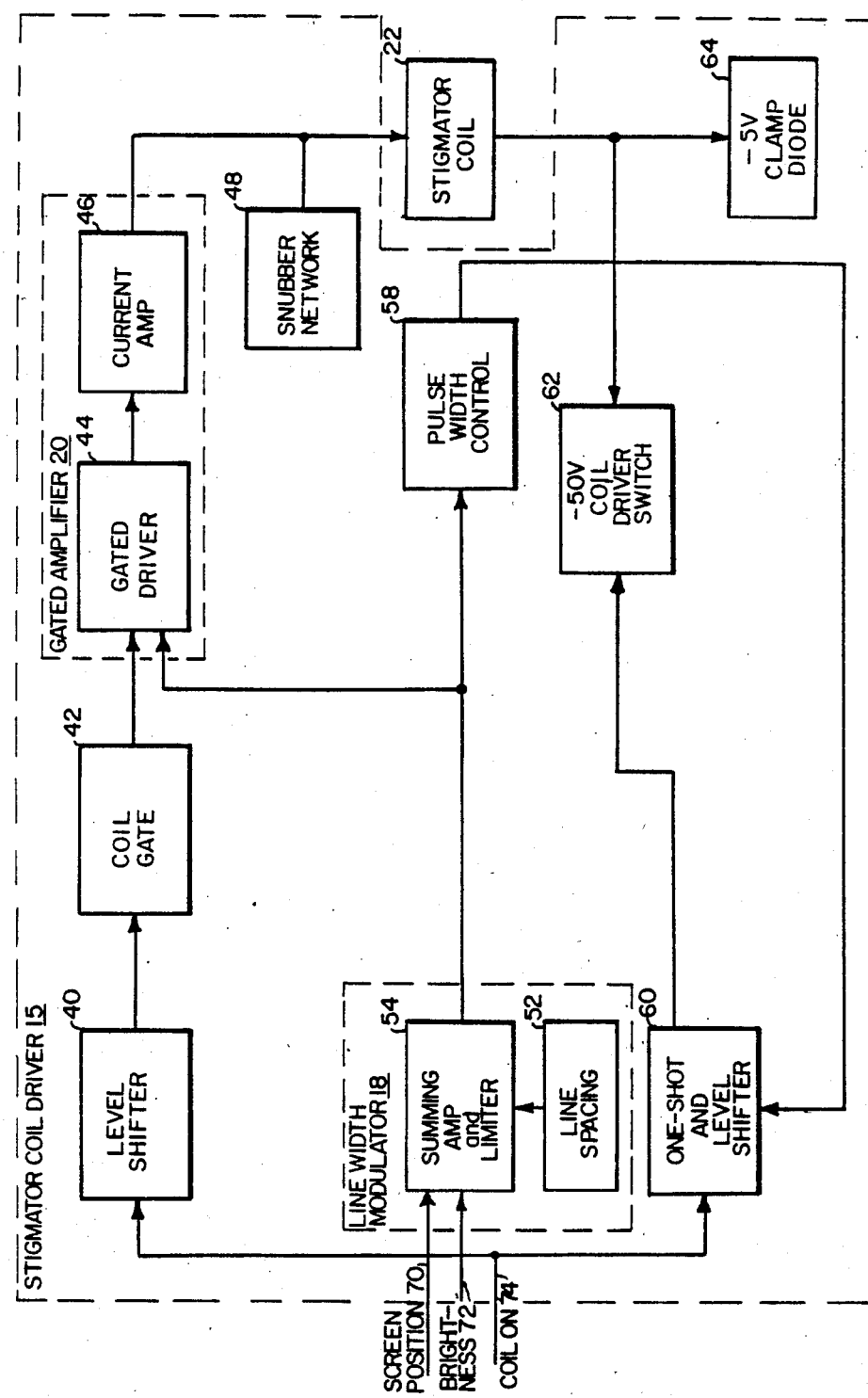
FIG. 6 is a functional block diagram of a stigmator coil driver.

Referring now to FIGS. 6 and 7 there is shown a functional block diagram and schematic diagram, respectively of the stigmator coil driver 15 connected to and providing the drive current to stigmator coil 22. The Coil On 74 signal from the display generator 21, coupled to the level shifter 40 and the one shot and level shifter 60, causes the stigmator coil 22 to be energized by placing coil gate 42 in an ON state which enables gated driver 44. Gated driver 44 follows an analog voltage from the output of summing amplifier and limiter 54 and this voltage is converted into a proportional current by current amplifier 46. The output of current amplifier 46 is connected to and drives the stigmator coil 22. Level shifter 40 receives a positive going Coil On 74 signal into amplifier 102 whose output goes to the base of emitter follower 108. Resistors 114, 116 and 117 provide the biasing for transistor 120 which produces a level shifted replication of the Coil On 74 signal having a voltage swing from −5 V to +5 V. The output from the collector of transistor 120 connects to the emitter of the transistor 138 in gated driver 44 and to the diode 142 at the base input to transistor 146. The current output from current amplifier 46 at the collector of transistor 146 is connected to and drives the stigmator coil 22.

Still referring to FIGS. 6 and 7, when the Coil On 74 signal is applied to one shot and level shifter 60, a 2 microsecond pulse is generated which is coupled to a −50 V coil driver switch 62. A capacitor 204 in conjunction with resistor 206 coupled to a pulse width control 58 circuit determines the pulse width generated by one shot 202 as a function of the stigmator coil 22 drive current. A pulse output from the one shot 202 is coupled via capacitor 208 to the base input of transistor 232 which is the input section of a −50 V coil driver switch 62. The driver switch 62 connects −50 V 246 to a first terminal of stigmator coil 22 via the collector of switching transistor 242 for said 2 microsecond interval, thereby allowing said coil to quickly rise to its required current. The same first terminal of the stigmator coil 22 is also connected to a −5 V clamp diode 64, and after said 2 microsecond interval, −50 V 246 is removed and −5.2 V 252 is applied to the stigmator coil 22 via zener diode 250 in order to reduce power dissipation.

A line width modulator 18 provides control of the current passing through the stigmator coil 22 and comprises a line spacing 52 voltage adjustment by a potentiometer 154 connected to resistor 152 which connects to +5 V 151. The adjustment of potentiometer 154 selects the spacing between the lines of the pseudo-raster pattern illustrated in FIG. 5 and provides for the ability of completely filling the space between two adjacent raster lines once the width of a widened or elongated electron beam has been established. The output 71 of the high gain amplifier 156 is coupled to one end of input resistor 166 of the summing amplifier and limiter 54. Input signal Screen Position 70 connects to resistor 164 and input signal Brightness 72 connects to resistor 168 of summing amplifier and limiter 54. The output of the summing amplifier and limiter 54, at the junction of resistors 184 and 186, which is the output of said line width modulator 18, provides the correction factor to the stigmator coil drive current generated by current amplifier 46 in order to maintain constant line width on the CRT screen 27 as the Brightness 72 voltage varies or as the electron beam Screen Position 70 varies.

Another output of summing amplifier and limiter 54 at the output of amplifier 176 connects to the input of the pulse width control 58 circuit at the base 213 of transistor 214 which has its emitter 215 connected to resistor 206 of the one-shot and level shifter 60. The pulse width control 58 is used to vary the pulse width of said one shot 202 circuit as a function of stigmator coil current in order to maintain constant di/dt for greater efficiency of turn-on.

A snubber network 48, connected to the junction of the collector of transistor 146 in the current amplifier 46 and a second terminal of the stigmator coil 22, provides a path for the drive current to decay through transistor 194 and diode 196 and limits any voltage increase across the stigmator coil 22 when said coil is turned-off.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A display system comprising:
   means for generating lines in a raster pattern with an energy beam on said display system;
   means for defocusing said energy beam primarily in a direction normal to a movement of said beam for substantially filling in spaces between said lines in accordance with a control signal.

2. The display system as recited in claim 1 wherein:
   said energy beam comprises an electron beam.

3. The display system as recited in claim 1 wherein:
   said line generating means comprises a memory means for storage of data used for specifying boundaries of said lines.

4. The display system as recited in claim 1 wherein:
   said energy beam defocusing means comprises a stigmator coil means.

5. The display system as recited in claim 4 wherein:
   said control signal activates said stigmator coil means for displaying weather data.

6. A display system comprising:
   means for generating lines in a raster pattern with an energy beam on said display system;
   means for defocusing said energy beam primarily in a direction normal to a movement of said beam for substantially filling in space between said lines in accordance with a control signal; and
   means for controlling the width of said energy beam as the intensity of said beam varies.

7. The display system as recited in claim 6 wherein:
   said energy beam comprises an electron beam.

8. The display system as recited in claim 6 wherein:
   said line generating means comprises a memory means for storage of data used for specifying boundaries of said lines.

9. The display system as recited in claim 6 wherein:
   said energy beam widening means comprises a stigmator coil means.

10. The display system as recited in claim 9 wherein:
    said control signal activates said stigmator coil means for displaying weather data.

11. The display system as recited in claim 9 wherein:
    said stigmator coil means comprises a driver means coupled to a stigmator coil.

12. The display system as recited in claim 11 wherein:
    said stigmator coil is disposed around the neck of a cathode-ray tube containing said energy beam.

13. The display system as recited in claim 6 wherein:
    said energy beam width controlling means further comprises means for controlling said width as screen position varies.

14. The display system as recited in claim 6 wherein:
    said energy beam width controlling means further comprises means for selecting the spacing between said lines.

15. A display system comprising:
    a cathode-ray tube;
    means for displaying weather data concurrently with target data and graphics data on said cathode-ray tube;
    means for generating lines in a raster pattern with an electron beam in said cathode-ray tube in accordance with a control signal means, said control signal means determining when weather data is being displayed; and
    stigmator coil means coupled to said control signal means for defocusing said electron beam primarily in a direction normal to the movement of said beam for substantially filling in spaces between said lines for displaying said weather data.

16. The display system as recited in claim 15 wherein:
said line generating means comprises a memory means for storage of data used for specifying boundaries of said lines.

17. The display system as recited in claim 15 wherein:
said stigmator coil means comprises a current driver means coupled to a stigmator coil.

18. The display system as recited in claim 15 wherein:
said stigmator coil is disposed around the neck of said cathode-ray tube containing said electron beam.

19. A display system comprising:
a cathode-ray tube;
means for generating lines in a raster pattern with an electron beam on said cathode-ray tube;
a stigmator coil disposed around the neck of said cathode-ray tube for defocusing said electron beam primarily in a direction normal to a movement of said beam for substantially filling in spaces between said line in accordance with a control signal;
stigmator coil driver means coupled to said stigmator coil for providing current through said stigmator coil;
said control signal coupled to said driver means for activating said driver means when weather data is being displayed; and
line width control means for said electron beam coupled to said driver means for maintaining a constant line width during varying beam intensities.

20. The display system as recited in claim 19 wherein:
said line generating means comprises a memory means for storage of weather data used for specifying boundaries of said lines.

21. The display system as recited in claim 20 wherein:
said memory means further comprises target and graphics data for display on said cathode-ray tube.

22. The display system as recited in claim 21 wherein:
said display system comprises a display generator means for control of said weather data concurrently displayed with said target and graphics data.

23. The display system as recited in claim 19 wherein:
said line width control means for said electron beam further maintains a constant line width as said beam changes position on said cathode-ray tube.

* * * * *